(12) United States Patent
Panthera

(10) Patent No.: US 11,873,088 B1
(45) Date of Patent: Jan. 16, 2024

(54) AIRCRAFTS BEING POSITIONABLE INTO A STOWED POSITION AND A FLIGHT POSITION

(71) Applicant: IIXXMMXXI LLC, Vernon, CT (US)

(72) Inventor: Aidan Panthera, Vernon, CT (US)

(73) Assignee: IIXXMMXXI LLC, Vernon, CT (US)

( * ) Notice: Subject to any disclaimer, the term of this patent is extended or adjusted under 35 U.S.C. 154(b) by 18 days.

(21) Appl. No.: 17/682,631

(22) Filed: Feb. 28, 2022

(51) Int. Cl.
  *B64C 3/56* (2006.01)
  *B64C 29/00* (2006.01)

(52) U.S. Cl.
  CPC ............ *B64C 3/56* (2013.01); *B64C 29/0033* (2013.01)

(58) Field of Classification Search
  CPC ..................................... B64C 3/56; B64C 3/38
  See application file for complete search history.

(56) References Cited

U.S. PATENT DOCUMENTS

| | | | | |
|---|---|---|---|---|
| 3,083,935 A * | 4/1963 | Piasecki | .................... | B64C 3/38 244/12.3 |
| 5,645,250 A * | 7/1997 | Gevers | ................... | B64D 29/04 244/50 |
| 8,439,314 B1 * | 5/2013 | Dhall | ...................... | B64C 39/12 244/45 R |
| 9,469,391 B1 * | 10/2016 | Dong | ...................... | B64C 3/385 |
| 2009/0166477 A1 * | 7/2009 | Bousfield | .................. | B64C 3/56 244/218 |
| 2018/0297698 A1 * | 10/2018 | Dhall | ........................ | B60F 5/02 |
| 2018/0327077 A1 * | 11/2018 | McCoy | ................... | B64C 3/185 |
| 2022/0169400 A1 * | 6/2022 | Seeley | .................... | B64C 25/10 |
| 2022/0212779 A1 * | 7/2022 | Randall | .................... | B64C 1/30 |
| 2022/0242182 A1 * | 8/2022 | Karadia | .................... | B64C 3/56 |

* cited by examiner

*Primary Examiner* — Tien Q Dinh
*Assistant Examiner* — William L Gmoser
(74) *Attorney, Agent, or Firm* — Dinsmore & Shohl LLP

(57) ABSTRACT

An aircraft including a fuselage extending in an aircraft longitudinal direction, a wing coupled to the fuselage and extending in an aircraft lateral direction perpendicular to the aircraft longitudinal direction, and a displacement assembly configured to translate the wing relative to the fuselage in the aircraft lateral direction between a flight position and a stowed position. In the flight position, the displacement assembly is positioned at a central portion between opposite end portions of the wing such that the displacement assembly is positioned a first distance from one of the end portions of the wing. In the stowed position, the displacement assembly is positioned proximate one of the end portions of the wing such that the displacement assembly is positioned a second distance from the one of the end portions of the wing, the second distance being less than the first distance.

20 Claims, 6 Drawing Sheets

AIRCRAFTS BEING POSITIONABLE INTO A STOWED POSITION AND A FLIGHT POSITION

TECHNICAL FIELD

The present specification generally relates to aircrafts capable of vertical takeoff and landing and, more specifically, aircrafts being positionable from a flight position into a stowed position to occupy less ground space.

BACKGROUND

Aircrafts require wings having a large wingspan to produce sufficient lift to raise the aircraft off the ground and maintain altitude. The wings may extend transversely to a fuselage of the aircraft. The wings and the fuselage cooperate to substantially form a cross shape. The cross shape of the wings and the fuselage uses an inefficient amount of storage space. While a large storage space, such as an aircraft hangar, may be able to accommodate the size and shape of the aircraft, such large storage spaces may be expensive and not conducive to storing an aircraft on personal property.

Additionally, aircrafts are not able to land and takeoff in a limited space such as on personal property or a driveway. Furthermore, aircrafts are not able to clear obstacles such as buildings, trees, poles, wires, and the like on approach during landing and departing after takeoff.

Accordingly, a need exists for alternative aircrafts that may be positioned within a particular position taking up a reduced amount of ground space.

SUMMARY

In one embodiment, an aircraft including a fuselage extending in an aircraft longitudinal direction, a wing coupled to the fuselage and extending in an aircraft lateral direction perpendicular to the aircraft longitudinal direction, and a displacement assembly configured to translate the wing relative to the fuselage in the aircraft lateral direction between a flight position and a stowed position. In the flight position, the displacement assembly is positioned at a central portion between opposite end portions of the wing such that the displacement assembly is positioned a first distance from one of the end portions of the wing. In the stowed position, the displacement assembly is positioned proximate one of the end portions of the wing such that the displacement assembly is positioned a second distance from the one of the end portions of the wing, the second distance being less than the first distance.

In another embodiment, an aircraft including a fuselage having a channel formed therein extending along a longitudinal axis of the fuselage, and a wing assembly comprising a wing, a shaft extending from a bottom surface of the wing, and a bearing device provided at an end of the shaft opposite the wing. The bearing device is positioned in the channel of the fuselage to rotatably couple the wing to the fuselage. The wing is movable between a wing flight position and a wing stowed position. When moving between the wing flight position and the wing stowed position, the wing rotates relative to the fuselage in a first rotational direction and translates in a first translating direction along the longitudinal axis of the fuselage.

In yet another embodiment, a method of operating an aircraft, the method comprising the steps of activating one or more engines of an engine assembly of the aircraft to generate thrust in a vertical direction, and moving a wing along the displacement assembly in the lateral direction between a flight position and a stowed position. The aircraft includes a fuselage extending in an aircraft longitudinal direction, a wing coupled to the fuselage, the wing extending in an aircraft lateral direction perpendicular to the aircraft longitudinal direction, and a displacement assembly configured to translate the wing relative to the fuselage and in the aircraft lateral direction. In the flight position, the displacement assembly is positioned at a central portion between opposite end portions of the wing such that the displacement assembly is positioned a first distance from one of the end portions of the wing. In the stowed position, the displacement assembly is positioned proximate one of the end portions of the wing such that the displacement assembly is positioned a second distance from the one of the end portions of the wing, the second distance being less than the first distance.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to an aircraft with a movable wing to reduce the amount of space occupied by the aircraft when stowed. The aircraft may generally include a fuselage, an engine assembly rotatably coupled to the fuselage, a pair of wings, and a pair of displacement assemblies for movably coupling the pair of wings to the fuselage. Each of the displacement assemblies may include shafts extending from the fuselage, rollers coupled to the shafts and engaging the wings to movably couple the wings to the fuselage, and engaging members located at the ends of the shafts opposite the fuselage. Each of the wings may include openings formed therein that receive the engaging members when in engaged locked position. When the engaging members engage the openings in the wings, the wings are fixed relative to the fuselage. When the engaging members are in an unlocked position and positioned outside of the openings of the wings, the wings are movable in an aircraft lateral direction. Accordingly, the aircraft is positionable between a flight position (FIG. 1) in which the wings are fixed at a wing flight position relative to the fuselage, and a stowed position (FIG. 2) in which the wings are translated relative to the fuselage to a wing stowed position. Various embodiments of the aircraft and the operation of the aircraft will be described in more detail herein.

As used herein, the term "aircraft longitudinal direction" refers to the forward-rearward direction of the vehicle (i.e., in the +/−aircraft Y-direction as depicted). The term "aircraft lateral direction" refers to the cross-vehicle direction of the aircraft (i.e., in the +/−aircraft X-direction as depicted), and is transverse to the aircraft longitudinal direction. The term "aircraft vertical direction" refers to the upward-downward direction of the aircraft (i.e., in the +/−aircraft Z-direction as depicted). Further, the terms "upward," "downward," "rearward," and "forward" are used to describe the relative positioning of various components of the vehicle relative to one another. Because the vehicle structures may be generally symmetrical about the vehicle centerline, the terms "upward," "downward," "rearward," and "forward" may be switched when evaluating components positioned along opposite sides of the aircraft. Further, while certain components of the aircraft are described as extending in one of the identified directions or oriented toward one of the identified directions, it should be understood that these components extend or are oriented in at least these recited directions.

Figure 1:
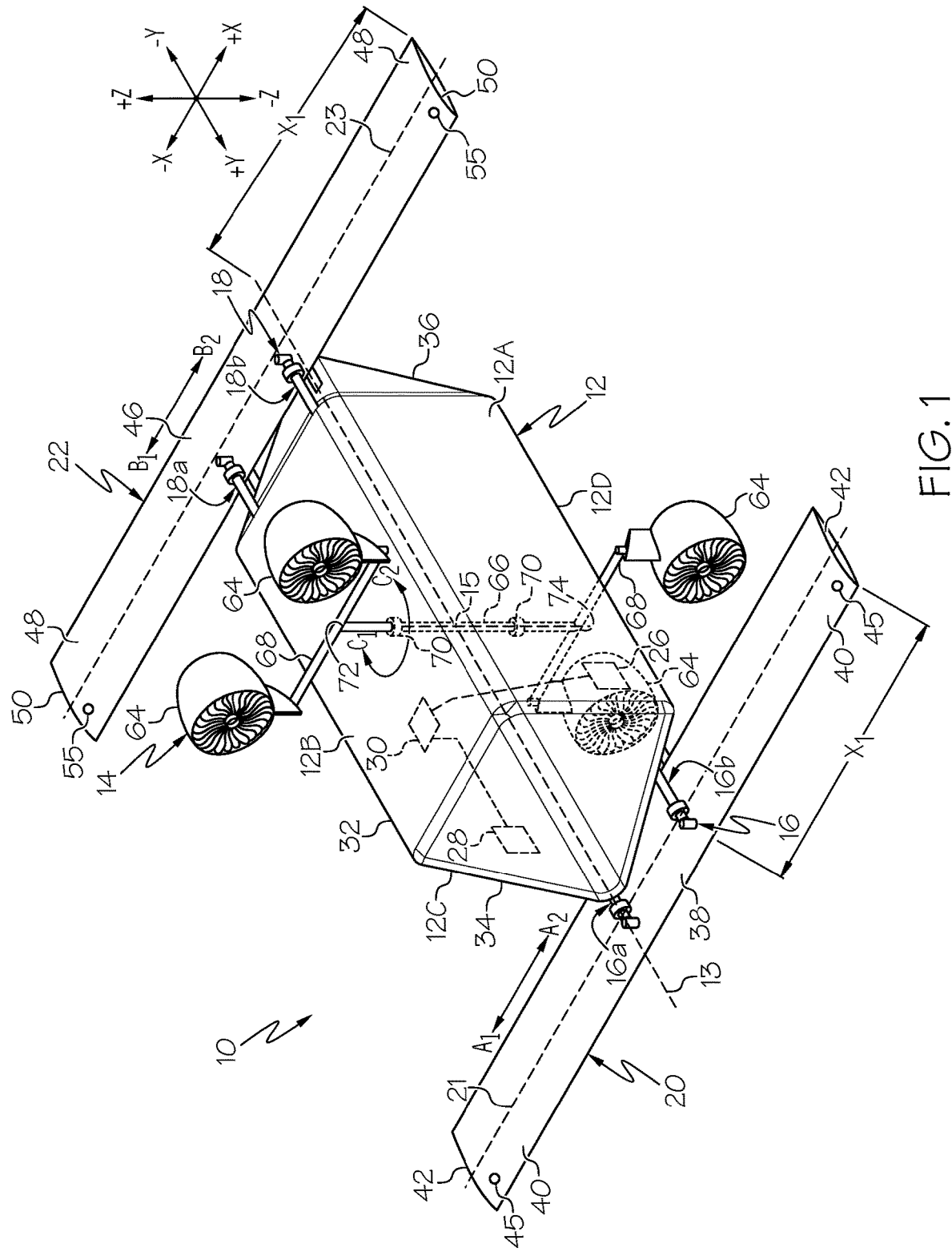
FIG. 1 schematically depicts a perspective view of an aircraft in a flight position, according to one or more embodiments shown and described herein.
Figure 2:
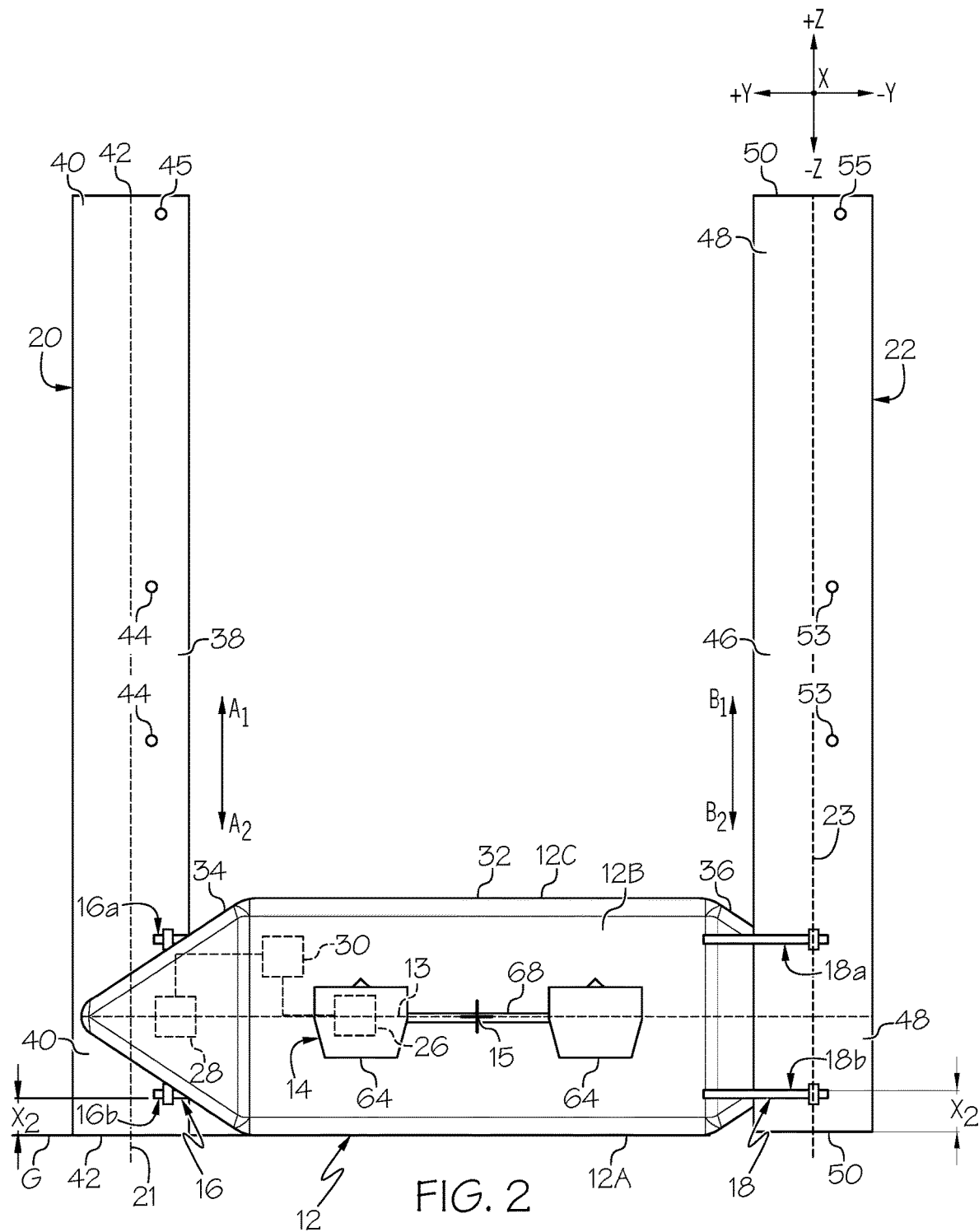
FIG. 2 schematically depicts a side view of the aircraft of FIG. 1 in a stowed position, according to one or more embodiments shown and described herein.

Referring now to FIGS. 1 and 2, an aircraft 10 is depicted including a fuselage 12, an engine assembly 14, a front displacement assembly 16, a rear displacement assembly 18, a front wing 20, and a rear wing 22. The aircraft 10 may be moveable between a flight position (FIG. 1) and a stowed position (FIG. 2). The fuselage 12 may include a main body 32, a closed front end 34, and a closed rear end 36 opposite the front end 34. A fuselage longitudinal axis 13 extends through a length of the fuselage 12 from the front end 34 to the rear end 36. As depicted in FIG. 1, the main body 32 of the fuselage 12 has a generally rectangular cross-section. Accordingly, the fuselage 12 may include a first side surface 12a, an upper surface 12b, a second side surface 12c opposite the first side surface, and a lower surface 12d opposite the upper surface 12b. However, the fuselage 12 may comprise any shape suitable for providing optimal aerodynamics. The front end 34 and the rear end 36 of the fuselage 12 may be tapered. The front end 34 and the rear end 36 may be conical or pyramidal to reduce air resistance and provide other benefits. The corners of the main body 32, the front end 34 and the rear end 36 may include chamfers or fillets to further reduce air resistance.

The front wing 20 may include a front wing longitudinal axis 21, a central portion 38, a pair of end portions 40 positioned on opposing sides of the central portion 38 such that the central portion 38 is located at a substantially medial position between the pair of end portions 40, a pair of ends 42, and a pair of openings 44 (FIG. 2) formed in the central portion 38. In embodiments, the front wing 20 may include an opening 45 located at opposite ends 42 of the front wing 20. The front wing longitudinal axis 21 may extend along a length of the front wing 20 through the pair of ends 42. The rear wing 22 may similarly include a rear wing longitudinal axis 23, a central portion 46, a pair of end portions 48 positioned on opposing sides of the central portion 46 such that the central portion 46 is located at a substantially medial position between the pair of end portions 48, a pair of ends 50, and a pair of openings 53 (FIG. 2) formed in the central portion 46. In embodiments, the rear wing 22 may include an opening located at opposite ends 50 of the rear wing 22. The rear wing longitudinal axis 23 may extend along a length of the rear wing 22 through the pair of ends 50. The front wing 20 and the rear wing 22 may include any operable cross-sectional shape to produce lift during operation of the aircraft 10, such as, for example, an airfoil.

Figure 3:
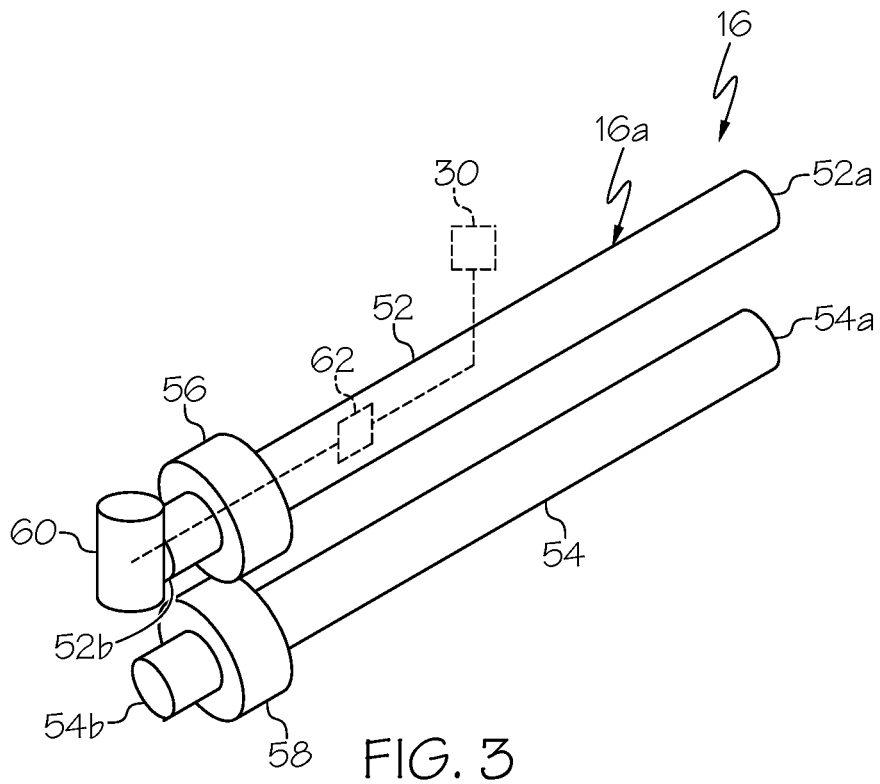
FIG. 3 schematically depicts a perspective view of a displacement assembly of the aircraft of FIG. 1 with an engaging member in an unlocked position, according to one or more embodiments shown and described herein.

Referring now to FIGS. 1-3, the front displacement assembly 16 may include a first front roller device 16a and a second front roller device 16b. The second front roller device 16b may extend in parallel with and be spaced apart from the first front roller device 16a. It should be appreciated that first front roller device 16a and the second front roller device 16b are identical in structure and thus only the first front roller device 16a illustrated in FIGS. 3 and 4 will be discussed in detail herein. The first front roller device 16a may include an upper shaft 52, a lower shaft 54 spaced apart from the upper shaft 52, an upper roller 56, a lower roller 58, and an engaging member 60. The upper shaft 52 may include a first end 52a and an opposite second end 52b. The lower shaft 54 may include a first end 54a and an opposite second end 54b. The first end 52a of the upper shaft 52 and the first end 54a of the lower shaft 54 may be coupled to the front end 34 of the fuselage 12. The upper shaft 52 and the lower shaft 54 may extend away from the fuselage 12 parallel to the fuselage longitudinal axis 13. The upper shaft 52 may extend through the upper roller 56 to rotatably couple the upper roller 56 to the upper shaft 52. The lower shaft 54 may extend through the lower roller 58 to rotatably couple the lower roller 58 to the lower shaft 54. The upper roller 56 and the lower roller 58 may be spaced apart such that the front wing 20 may be positioned between the upper roller 56 and the lower roller 58. While FIGS. 1-4 depict the upper roller 56 and the lower roller 58 as wheels, the upper roller 56 and the lower roller 58 may be any structure capable of moving the front wing 20 and the rear wing 22 relative to the fuselage 12 for example a rack and pinion.

The front displacement assembly 16 may be configured to translate the front wing 20 between a wing flight position (FIG. 1) and a wing stowed position (FIG. 2) by translating, such as by linearly displacing, the front wing 20 relative to the fuselage 12 in the direction of arrows A1 and A2. Similarly, the rear displacement assembly 18 may be configured to translate the rear wing 22 between a wing flight position and the wing stowed position by translating the rear wing 22 relative to the fuselage 12 in the direction of arrows B1 and B2. In the flight position, the front wing longitudinal axis 21 and the rear wing longitudinal axis 23 extend perpendicular to a fuselage longitudinal axis 13 that extends in the aircraft longitudinal direction. In the stowed position, the front wing longitudinal axis 21 and the rear wing longitudinal axis 23 extend perpendicular to the aircraft vertical direction.

Figure 4:
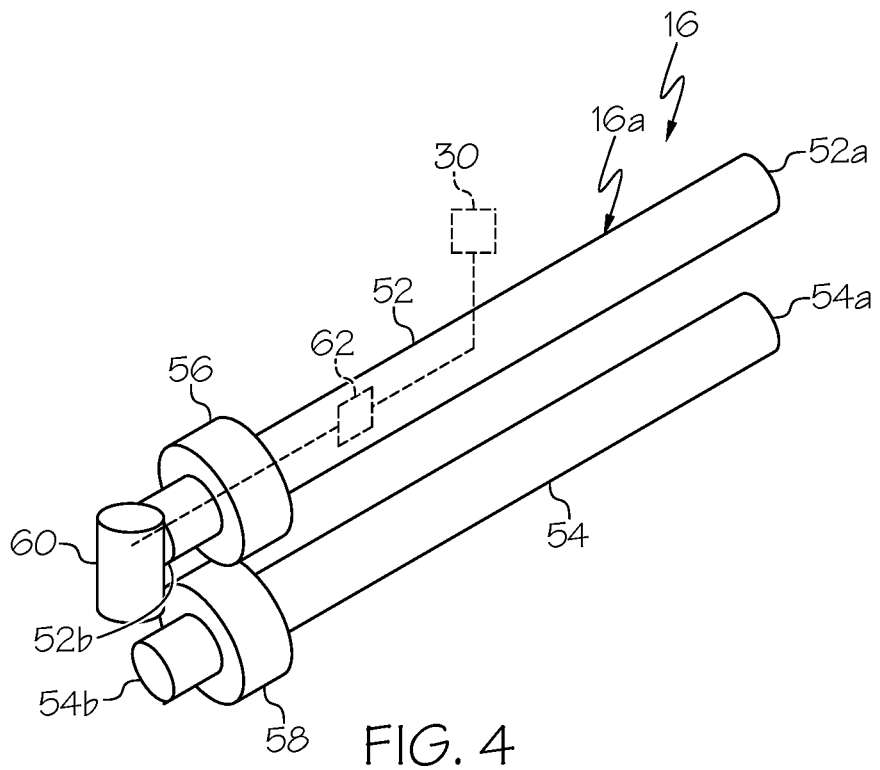
FIG. 4 schematically depicts a perspective view of the displacement assembly of FIG. 3 with the engaging member in a locked position, according to one or more embodiments shown and described herein.

The engaging member 60 may be movably coupled to the second end 52b of the upper shaft 52. The engaging member 60 may be movable toward the lower shaft 54 in a direction transverse, or perpendicular, to the fuselage longitudinal axis 13 between an unlocked position (FIG. 3) and a locked position (FIG. 4). The engaging member 60 may be shaped to be capable of being positioned in the openings 44, 45 in the front wing 20 to fix the position of the front wing 20.

Referring to FIG. 3, in the unlocked position, the engaging member 60 is retracted to be spaced apart from the openings 44, 45 in the front wing 20. Referring to FIG. 4, in the locked position, the engaging member 60 is extended to be positioned within one of the pair of openings 44, 45 in the front wing 20 to inhibit the front wing 20 from moving along the upper roller 56 and the lower roller 58. While the engaging member 60 is depicted as movably coupled to the upper shaft 52, it is contemplated and possible that the engaging member 60 may be movably coupled to another component, such as, for example, the lower shaft 54, the front wing 20, the rear wing 22, the fuselage 12, or any combination thereof. In embodiments where the engaging members 60 are movably coupled to the front wing 20 and/or the rear wing 22, the openings 44, 45, 53, 55 may be formed in the first front roller device 16a and a second front roller device 16b.

The front wing 20 may be positioned between the upper roller 56 and the lower roller 58 of each of the first front roller device 16a and the second front roller device 16b. The first front roller device 16a and the second front roller device 16b may inhibit the front wing 20 from moving in a direction transverse to the front wing longitudinal axis 21 while allowing the front wing 20 to move along the upper roller 56 and the lower roller 58 in the direction of arrow A1 and arrow A2. Arrow A1 and arrow A2 extend parallel to the direction of the front wing longitudinal axis 21.

Similar to the front displacement assembly 16, the rear displacement assembly 18 may include a first rear roller device 18a and a second rear roller device 18b. The first rear roller device 18a and second rear roller device 18b are identical in structure to the first front roller device 16a and the second front roller device 16b of the front displacement assembly 16, and will not be described in detail for brevity. The upper shaft 52 and the lower shaft 54 of each of the first rear roller device 18a and the second rear roller device 18b may be coupled to the rear end 36 of the fuselage 12 and extend away from the fuselage 12 in a direction parallel to the fuselage longitudinal axis 13. The rear wing 22 may be positioned between the upper roller 56 and the lower roller 58 of each of the first rear roller device 18a and the second rear roller device 18b similarly to the front wing 20 being positioned between the upper roller 56 and the lower roller 58 of each of the first front roller device 16a and the second front roller device 16b. The first rear roller device 18a and the second rear roller device 18b may inhibit the rear wing 22 from moving in a direction transverse to the rear wing longitudinal axis 23 while allowing the rear wing 22 to move between the upper roller 56 and the lower roller 58 in the direction of arrow B1 and arrow B2. Arrow B1 and arrow B2 extend parallel to the direction of the rear wing longitudinal axis 23.

The aircraft 10 may additionally include a sensor 28 and a first motor 62 (FIG. 3) operatively coupled to the engaging members 60 of each of the front displacement assembly 16 and the rear displacement assembly 18. The first motor 62 may be configured to move the engaging members 60 between the unlocked position and the locked position. The sensor 28 may be configured to detect when the engaging members 60 are aligned with the openings 44 formed in the front wing 20 and/or the rear wing 22 such that the engaging members 60 are positioned over and can extend into the openings 44. When the sensor 28 detects that the engaging members 60 are aligned with the openings 44, the first motor 62 may be actuated to extend the engaging members 60 into the openings 44 in the front wing 20 and/or the openings 53 in the rear wing 22 to maintain the front wing 20 and the rear wing 22 in the wing flight position. In embodiments, the sensor 28 may be positioned within the fuselage 12 and detect indicia positioned on the front wing 20 and the rear wing 22. The detected indicia may indicate the position of the front wing 20 and the rear wing 22 relative to the sensor 28. The sensor 28 may be, for example, a hall effect sensor, a camera, an inductive sensor, a capacitive displacement sensor, or the like.

Referring again to FIG. 1, the engine assembly 14 may include one or more engines 64, a central shaft 66, a pair of crossbars 68, a pair of bearings 70, and a second motor 26. The central shaft 66 may define an engine longitudinal axis 15. In the flight position and the stowed position, the engine longitudinal axis 15 extends perpendicular to the fuselage longitudinal axis 13, the front wing longitudinal axis 21, and the rear wing longitudinal axis 23. The central shaft 66 may include a first end 72 and an opposite second end 74. The central shaft 66 may extend through the main body 32 of the fuselage 12 such that the first end 72 and the second end 74 extend from the main body 32. The pair of bearings 70 may be positioned in the main body 32 of the fuselage 12 at an interface between the central shaft 66 and the main body 32. The pair of bearings 70 may rotatably couple the central shaft 66 to the main body 32 of the fuselage 12. One of the crossbars 68 may be coupled to the first end 72 of the central shaft 66. The other of the crossbars 68 may be coupled to the second end 74 of the central shaft 66. The crossbars 68 may each extend transverse to the central shaft 66. In embodiments, an engine 64 may be positioned at opposite ends of each of the crossbars 68.

The engine assembly 14 may be configured to rotate relative to the fuselage 12 in the direction of arrows C1 and C2 between an engine horizontal flight position (FIG. 1) and an engine vertical flight position (FIG. 2). Each of the engines 64 are configured to generate thrust to drive the aircraft 10. The engines 64 may be any operable engine for driving an aircraft including a propeller engine, a jet engine, a fan, or the like. Referring to FIG. 1, when the engine assembly 14 is in the engine horizontal flight position, the engines 64 may generate thrust in the aircraft longitudinal direction and along the fuselage longitudinal axis 13. Referring to FIG. 2, when the engine assembly 14 is in the engine vertical flight position, the engines 64 may generate thrust in the aircraft vertical direction such that the aircraft 10 may ascend or descend in the aircraft vertical direction. The second motor 26 may be operatively coupled to the central shaft 66 and configured to rotate the central shaft 66 relative to the fuselage 12 to rotate the engine assembly 14 between the engine vertical flight position and the engine horizontal flight position. In embodiments, the central shaft 66 may rotate between the engine vertical flight position and the engine horizontal flight position due to differential thrust across the plurality of engines 64 without being controlled by the second motor 26.

The aircraft 10 may further include a controller 30 communicatively coupled to each of the first motor 62, the second motor 26, and the sensor 28. The controller 30 may be configured to receive a signal from the sensor 28 indicative of the engaging members 60 being positioned over the openings 44 in the front wing 20, the rear wing 22, or both. The controller may be configured to actuate the first motor 62 when the controller 30 receives a signal from the sensor 28 indicative of the engaging members 60 being positioned over the openings 44 in the front wing 20, the rear wing 22, or both to move the engaging members 60 to the locked position and into the openings 44 in the front wing 20, the rear wing 22, or both. The controller 30 may also be configured to actuate the first motor 62 to move the engaging members 60 to the unlocked position, thereby removing the engaging members 60 from the openings 44 in the front wing 20.

The controller 30 may comprise a processor and a non-transitory electronic memory to which various components are communicatively coupled. The controller 30 may include non-transitory electronic memory that stores a set of machine-readable instructions. The processor may execute the machine-readable instructions stored in the non-transitory electronic memory. The non-transitory electronic memory may comprise RAM, ROM, flash memories, hard drives, or any device capable of storing machine-readable instructions such that the machine-readable instructions can be accessed by the processor.

In FIG. 1, when the aircraft 10 is in the flight position, the front wing 20 is in the wing flight position with the central portion 38 of the front wing 20 being positioned between the first front roller device 16a and the second front roller device 16b such that the front displacement assembly 16 is positioned a first distance $X_1$ from one of the end portions of the front wing 20. Similarly, when the aircraft 10 is in the flight position, the rear wing 22 is in the wing flight position with the central portion 46 of the rear wing 22 is positioned between the first rear roller device 18a and the second rear roller device 18b such that the rear displacement assembly 18 is positioned the first distance $X_1$ from one of the end portions 48 of the rear wing 22. In the flight position, the fuselage longitudinal axis 13 may extend through the central portion 38 of the front wing 20 and the central portion 46 of the rear wing 22. In the flight position, the engine assembly 14 is in the engine horizontal flight position with the engines 64 generating thrust along the fuselage longitudinal axis 13. In the flight position, the engaging members 60 of the front displacement assembly 16 are positioned within the openings 44 in the front wing 20 and the engaging members 60 of the rear displacement assembly 18 are positioned within the openings 53 in the rear wing 22. In the flight position, the engine longitudinal axis 15 extends parallel to the Z-axis of the coordinate axes.

The aircraft 10 may move from the flight position to the stowed position to stow the aircraft 10 when not in use. Referring to FIG. 2, when in the stowed position, the front wing and the rear wing 22 are in the wing stowed position to be disposed such that the front wing longitudinal axis 21 and the rear wing longitudinal axis 23 extend in the aircraft vertical direction. The fuselage 12 may be rotated about the fuselage longitudinal axis 13 to move from the wing flight position to the wing stowed position. The engine assembly 14 may be configured to rotate about the engine longitudinal axis 15 relative to the fuselage 12 in the direction of arrow C1 and arrow C2 to rotate the aircraft 10 about the fuselage longitudinal axis 13 a predetermined angle relative to the fuselage longitudinal axis 13 such as the first side surface 12a of the fuselage 12 is positioned to face a ground surface G (FIG. 2), such that the front wing longitudinal axis 21 and the rear wing longitudinal axis 23 extend parallel to the Z-axis of the coordinate axes, as shown in FIG. 2. The predetermined angle may be 90 degrees. The fuselage 12 may rotate in either rotational direction about the fuselage longitudinal axis 13 such that the second side surface 12c of the fuselage 12 is positioned to face the ground surface G. In embodiments, the fuselage 12 may be rotated by operating the engines 64 to generate differing amounts of thrust that rotate the fuselage 12 about the fuselage longitudinal axis 13.

After the aircraft 10 has rotated the predetermined angle from the flight position to the stowed position, the engine longitudinal axis 15 extends perpendicular to the aircraft longitudinal direction, as shown in FIG. 2. Thereafter, the engine assembly 14 is operated to move the aircraft 10 in the aircraft vertical direction. In the stowed position, the engine assembly 14 is in the engine vertical flight position such that the engines 64 may generate thrust in the aircraft vertical direction parallel to the front wing longitudinal axis 21 and rear wing longitudinal axis 23. To move from the engine horizontal flight position to the engine vertical flight position, in embodiments, the controller 30 may actuate the second motor 26 to rotate the engine assembly 14 to the engine vertical flight position. As noted hereinabove, in other embodiments, a differential thrust may be applied across the plurality of engines 64 to rotate the central shaft 66 to the engine vertical flight position without being controlled by the second motor 26. In the stowed position, the engaging members 60 are in the unlocked position with the engaging members 60 spaced apart from the openings 44 in the front wing 20 and the openings 53 in the rear wing 22. When the aircraft 10 moves to the stowed position, the controller 30 may actuate the first motor 62 to move the engaging members 60 from the locked position to the unlocked position.

The aircraft 10 may be lowered toward the ground surface G with one of the pair of ends 42 of the front wing 20 and one of the pair of ends 50 of the rear wing 22 contacting the ground surface G. The contact between the ends 42, 50 of the front wing 20 and the rear wing 22 with the ground surface G moves the front wing 20 and the rear wing 22 along the front wing longitudinal axis 21 and the rear wing longitudinal axis 23, respectively, in the aircraft vertical direction. As the front wing 20 is moved along the front wing longitudinal axis 21 in the aircraft vertical direction, the upper roller 56 and the lower roller 58 of the first front roller device 16a and the second front roller device 16b are spaced apart from the central portion 38 of the front wing 20. The upper roller 56 and the lower roller 58 of the first front roller device 16a and the second front roller device 16b are positioned proximate one of the end portions 40 of the front wing 20 such that the front displacement assembly 16 is positioned a second distance $X_2$ from the one of the end portions 40 of the front wing 20, the second distance $X_2$ being less than the first distance $X_1$. Similarly, as the rear wing 22 is moved along the rear wing longitudinal axis 23 in the aircraft vertical direction, the upper roller 56 and the lower roller 58 of the first rear roller device 18a and the second rear roller device 18b are spaced apart from the central portion 46 of the rear wing 22. The upper roller 56 and the lower roller 58 of the first rear roller device 18a and the second rear roller device 18b are positioned proximate one of the end portions 48 of the rear wing 22 such that the rear displacement assembly 18 is positioned the second distance $X_2$ from the one of the end portions 48 of the rear wing 22. Once the aircraft 10, specifically the first side surface 12a of the fuselage 12, is positioned on the ground surface G, the front wing 20 and the rear wing 22 are disposed such that the central portions 38, 46 are positioned above the fuselage 12 in the aircraft vertical direction. In embodiments, in the flight position, the openings 44 in the front wing 20 and/or the openings 53 in the rear wing 22 may be positioned above the fuselage 12 in the aircraft vertical direction. In embodiments, the engaging members 60 may be configured to engage one of the openings in the front wing 20 and one of the openings 55 in the rear wing 22 to lock the front wing and the rear wing 22 in the wing stowed position.

The aircraft 10 may move from the stowed position to the flight position by repeating the above steps in the reverse order. Specifically, the engine assembly 14 is positioned in the engine vertical flight position and generates thrust in the aircraft vertical direction to lift the first side surface 12a of the fuselage 12 off the ground surface G. As the fuselage 12 is moved in the aircraft vertical direction, the front wing 20 moves along the front displacement assembly 16 and the rear wing 22 moves along the rear displacement assembly 18. When the upper roller 56 and the lower roller 58 are positioned to be in contact with the central portions 38, 46 of the front wing 20 and the rear wing 22, the controller 30 may receive a signal from the sensor 28 indicative of the engaging members 60 being aligned with (e.g., positioned over) the openings 44, 53 in the front wing 20 and the rear wing 22. The controller may then actuate the first motor 62 to move the engaging members 60 into the openings 44, 53 to fix the front wing 20 and the rear wing 22 in the wing flight position.

When the aircraft 10 reaches a desired altitude, the second motor 26 may be actuated by the controller 30 to move the engine assembly 14 from the engine vertical flight position to the engine horizontal flight position. Alternatively, a differential thrust applied across the engines 64 may cause the engine assembly to rotate into the engine horizontal flight position without the second motor 26. The engine assembly 14 may be operated to rotate the aircraft 10 the predetermined angle from the stowed position to the flight position about the fuselage longitudinal axis 13 such that the front wing longitudinal axis 21 and the rear wing longitudinal axis 23 extend in the aircraft lateral direction and the first side surface 12a of the fuselage 12 is rotated away from the ground surface G. The engine assembly 14 may then be operated to move the aircraft 10 in the aircraft longitudinal direction.

Figure 5:
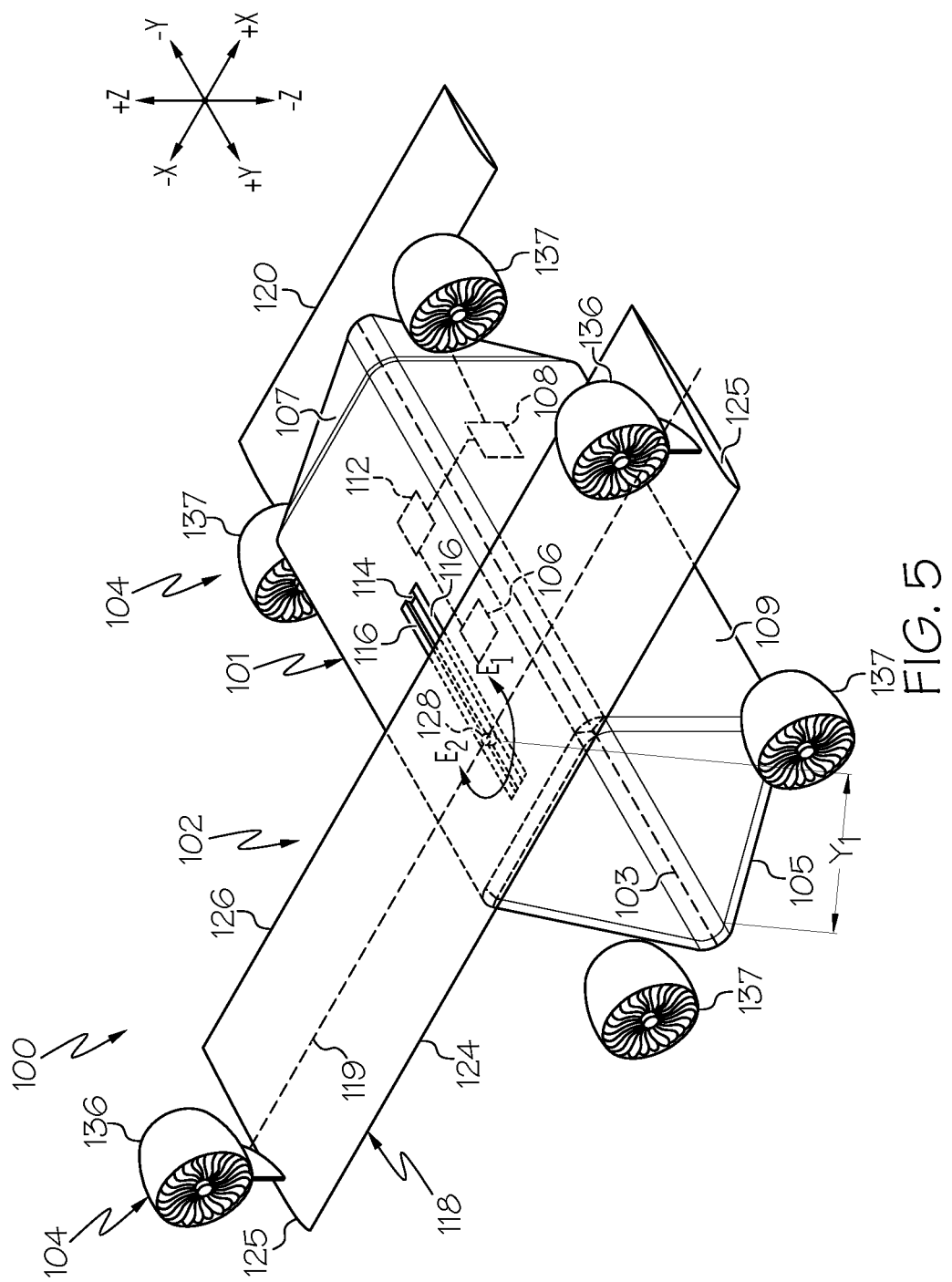
FIG. 5 schematically depicts a perspective view of another aircraft in a flight position, according to one or more embodiments shown and described herein.
Figure 6:
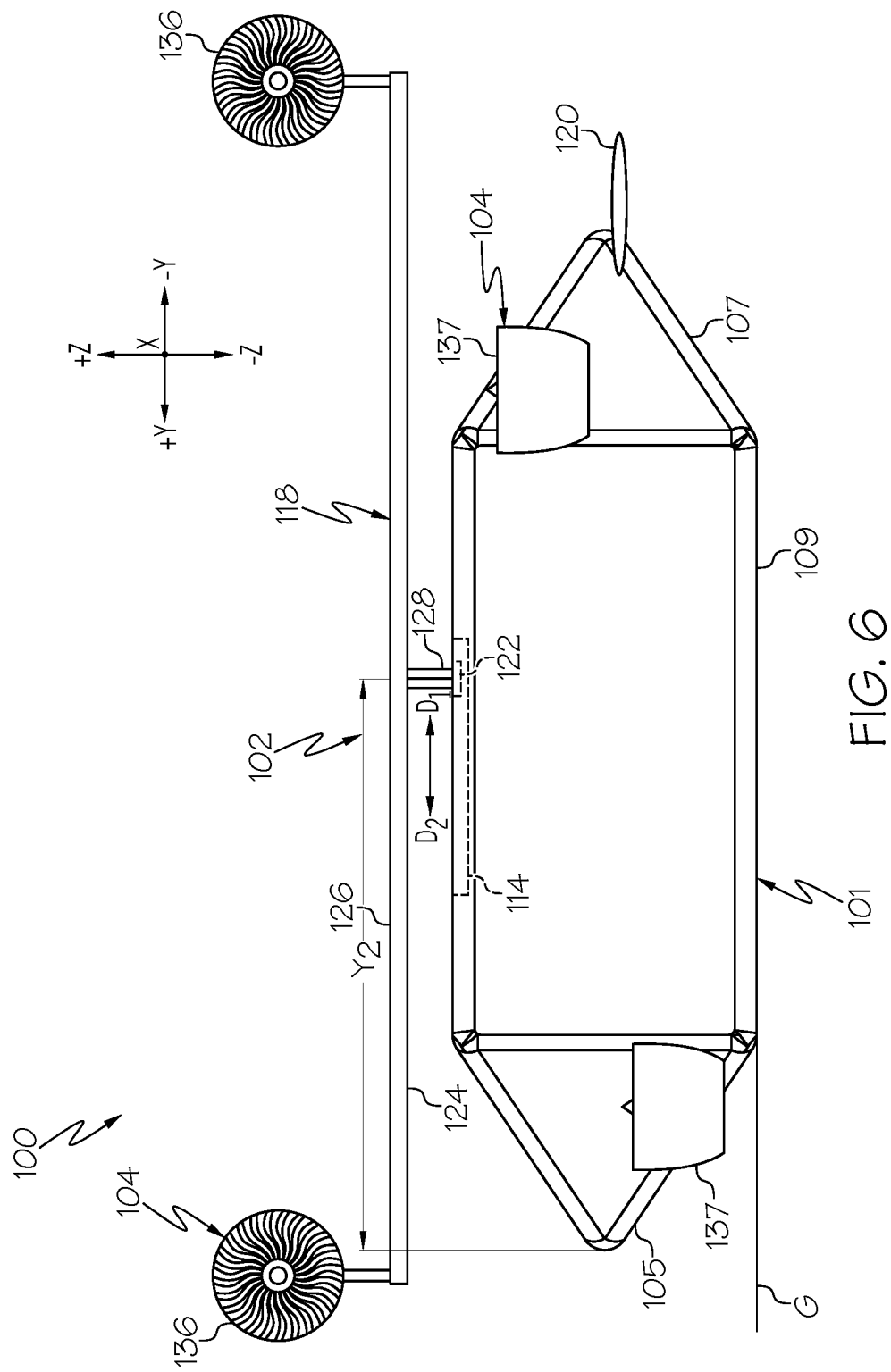
FIG. 6 schematically depicts a side view of the aircraft of FIG. 5 in a stowed position, according to one or more embodiments shown and described herein.
Figure 7:
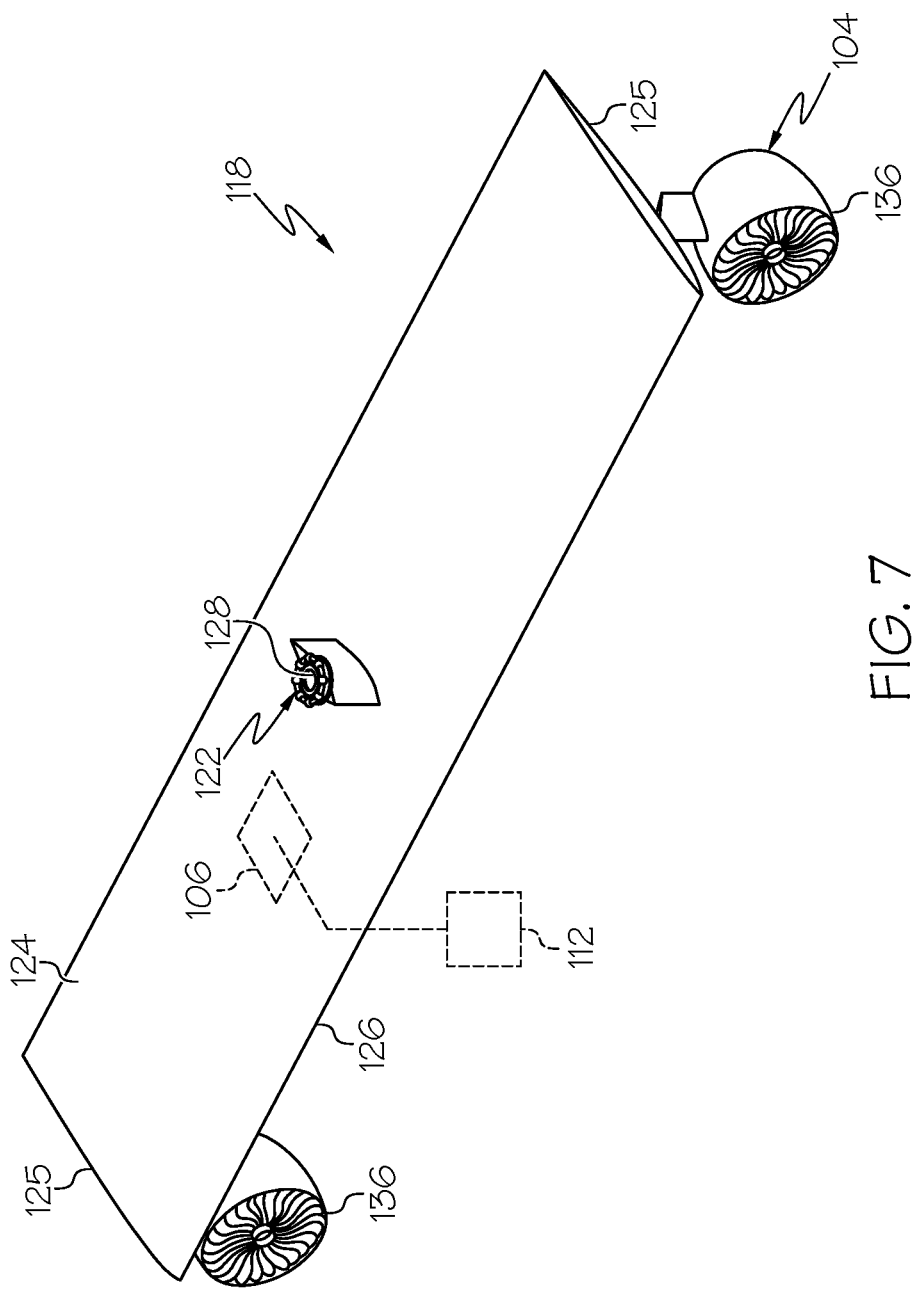
FIG. 7 schematically depicts a bottom perspective view of a wing assembly of the aircraft of FIG. 5, according to one or more embodiments shown and described herein.

Referring to FIGS. 5-7, another aircraft 100 is depicted and positionable between a flight position and a stowed position. The aircraft 100 may include a fuselage 101, a wing assembly 102, an engine assembly 104, a first motor 106, a second motor 108, and a controller 112. The fuselage 101 may be substantially similar to the fuselage 12 of the aircraft described above, and similar features will not be described again for brevity. The fuselage 101 may include a front end 105, an opposite rear end 107, a main body 109 disposed between the front end 105 and the rear end 107, a fuselage longitudinal axis 103 extending along a length of the fuselage 101 through the front end 105 and the rear end 107, a channel 114 formed in the main body 109, and a pair of flanges 116 that partially cover the channel 114. The channel 114 may extend along the main body 109 between the front end 105 and the rear end 107. The flanges 116 may be positioned at an upper end of the channel 114 and extend along a length of the channel 114. The flanges 116 may be fixedly coupled to the channel 114. The flanges 116 may be spaced apart from one another.

The wing assembly 102 may include a front wing 118 and a rear wing 120. The rear wing 120 may be fixedly coupled to the rear end 107 of the fuselage 101. The front wing 118 may include a pair of ends 125, a wing longitudinal axis 119 extending along a length of the front wing 118 to intersect the pair of ends 125, a bottom surface 124, an opposite top surface 126, and a shaft 128 extending from the bottom surface 124. A bearing device 122 is provided at an end of the shaft 128 opposite the bottom surface 124 of the front wing 118.

The bearing device 122 may be positioned within the channel 114 of the fuselage 101 below the pair of flanges 116. The shaft 128 may extend into the channel 114 between the pair of flanges 116 with the bearing device 122 positioned below the pair of flanges 116. The bearing device 122 may be sandwiched between an underside of the flanges 116 and a bottom surface of the channel 114 to allow the bearing device 122 to rotate within the channel 114, but prevented from being removed without also removing the flanges 116 from the channel 114. The bearing device 122 rotatably couples the front wing 118 to the fuselage 101. The front wing 118 may move, via the bearing device 122, between a wing flight position and an intermediate position. In the wing flight position, the wing longitudinal axis 119 may extend parallel to the aircraft lateral direction such that the aircraft 100 is configured to fly in the aircraft longitudinal direction. In the intermediate position, the front wing 118 is rotated such that the wing longitudinal axis 119 extends parallel to the fuselage longitudinal axis 103. When moving from the wing flight position to the intermediate position, the front wing 118 may rotate relative to the fuselage 101 in a first rotational direction. When moving from the intermediate position to the wing flight position, the front wing 118 may rotate relative to the fuselage 101 in a second rotational direction opposite the first rotational direction. The first rotational direction may be in the direction of arrow E1 and the second rotational direction may be in the direction of arrow E2.

Referring now to FIG. 6, subsequently, or in some embodiments simultaneously, the front wing 118 is translated along the channel 114 in the fuselage 101 in the direction of arrow D1 to position the front wing 118 into a wing stowed position from the intermediate position and the aircraft 100 into the stowed position, as shown in FIG. 6. In the wing flight position (FIG. 5), a first distance $Y_1$ between a center of the front wing 118 and the front end 105 of the fuselage 101 is less than a second distance $Y_2$ between the center of the front wing 118 and the front end 105 of the fuselage 101 when in the wing stowed position (FIG. 6). The center of the front wing 118 may be a center of the front wing 118 disposed equidistantly between the pair of ends 125. The first motor 106 may be operatively coupled to the bearing device 122, the front wing 118, or both such that the first motor 106 is configured to rotate the front wing 118 between the wing flight position and the intermediate position, as well as translate the front wing 118 relative to the fuselage 101 to position the front wing 118 into the wing stowed position and the aircraft 100 into the stowed position. When moving from the intermediate position to the wing stowed position, the front wing 118 may translate relative to the fuselage 101 in a first translating direction. When moving from the wing stowed position to the intermediate position, the front wing 118 may translate relative to the fuselage 101 in a second translating direction opposite the first translating direction. The first translating direction may be in the direction of arrow D1 and the second translating direction may be in the direction of arrow D2.

The engine assembly 104 may include a first set of engines 136 fixedly coupled to the front wing 118 and a second set of engines 137 rotatably coupled to the fuselage 101. The second set of engines 137 may be configured to rotate between an engine vertical flight position and an engine horizontal flight position. Referring to FIG. 5, in the engine horizontal flight position, the first set of engines 136 and the second set of engines 137 may generate thrust in a direction parallel to the fuselage longitudinal axis 103. Referring to FIG. 6, in the engine vertical flight position, the second set of engines 137 may generate thrust in the aircraft vertical direction transverse to the fuselage longitudinal axis 103. When the aircraft 100 is in the stowed position, the front wing 118 may be in the wing stowed position with the second set of engines 137 in the engine vertical flight position. When the aircraft 100 is in the flight position, the front wing 118 may be in the wing flight position with the second set of engines 137 in the engine horizontal flight position. The second motor 108 may be operatively coupled to the second set of engines 137, such that the second motor 108 is configured to rotate the second set of engines 137 between the engine horizontal flight position and the engine vertical flight position.

Referring to FIGS. 5-7, the controller 112 may be communicatively coupled to the first motor 106 and the second motor 108. The controller 112 may be configured to actuate the first motor 106 to move the front wing 118 between the wing flight position and the intermediate position. The controller 112 may be further configured to actuate the first motor 106 to move the front wing 118 between the intermediate position and the wing stowed position. The controller 112 may be configured to actuate the second motor 108 to move the engine assembly 104 between the engine vertical flight position and the engine horizontal flight position.

The operation of the aircraft 100 will now be described. The aircraft 100 may initially be in the flight position with the front wing 118 in the wing flight position, as shown in FIG. 5. In the flight position, both of the first set of engines 136 and the second set of engines 137 may be activated to generate thrust along the fuselage longitudinal axis 103. The second set of engines 137 of the engine assembly 104 may be rotated from the engine horizontal flight position to the engine vertical flight position by operating the second motor 108 to produce thrust in the aircraft vertical direction. When the second set of engines 137 are in the engine vertical flight position, the first set of engines 136 may be deactivated such that the engines 136 do not produce thrust. Thereafter, the first motor 106 may be operated to rotate the front wing 118 in the direction of arrow E1 to position the front wing 118 into the intermediate position. In other embodiments, the front wing 118 may be positioned into the intermediate position by applying a differential thrust across the first set of engines 136 without being controlled by the first motor 106. Either subsequently or simultaneously, the first motor 106 may be operated to translate the front wing 118 in the direction of arrow D1, as shown in FIG. 6, to position the front wing 118 into the wing stowed position. In other embodiments, the front wing 118 may be positioned into the wing stowed position from the wing flight position by initially translating the front wing 118 in the direction of arrow D1 and subsequently rotating the front wing 118 in the direction of arrow E1. The front wing 118 may be translated in the direction of arrow D1 by performing a reverse thrust operation of the first set of engines 136 to translate the front wing 118 rearwardly relative to the fuselage 101. The front wing 118 may then rotate in the direction of arrow E1 by performing a differential thrust across the first set of engines 136. Thereafter, the second set of engines 137 may be operated to lower the aircraft 100 onto the ground surface G and position the aircraft 100 into the stowed position. The reverse operation may be performed to position the aircraft 100 back into the flight position. Specifically, the second set of engines 137 are operated to cause the aircraft 100 to lift and gain a desired altitude, at which point the first motor 106 may be operated to translate the front wing 118 in the direction of arrow D2 and into the intermediate position in either of the manners discussed herein. Subsequently or simultaneously, the front wing 118 may be operated to rotate in the direction of arrow E2 and into the wing flight position by the first motor 106 or by performing a differential thrust across the first set of engines 136, as discussed herein.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An aircraft comprising:
    a fuselage having a front end and an opposite rear end, the fuselage extending in an aircraft longitudinal direction;
    a wing coupled to the fuselage and extending in an aircraft lateral direction perpendicular to the aircraft longitudinal direction; and
    a displacement assembly configured to translate the wing relative to the fuselage in the aircraft lateral direction between a flight position and a stowed position,
    wherein in the flight position, the displacement assembly is positioned at a central portion between opposite end portions of the wing such that the displacement assembly is positioned a first distance from one of the end portions of the wing,
    wherein in the stowed position, the displacement assembly is positioned proximate one of the end portions of the wing such that the displacement assembly is positioned a second distance from the one of the end portions of the wing, the second distance being less than the first distance.

2. The aircraft of claim 1, wherein the displacement assembly comprises:
    a roller device comprising:
        a pair of shafts spaced apart from each other, each shaft of the pair of shafts coupled to the fuselage; and
        a pair of rollers rotatably coupled to the pair of shafts, the wing being positioned between the pair of rollers.

3. The aircraft of claim 2, wherein
    the wing comprises a pair of openings formed in the central portion,
    the roller device of each of the displacement assembly further comprises an engaging member configured to move between an unlocked position and a locked position to engage one of the pair of openings in the wing,
    in the locked position, the engaging member is positioned within one of the pair of openings to inhibit movement of the wing, and
    in the unlocked position, the engaging member is spaced apart from the pair of openings.

4. The aircraft of claim 3, wherein the displacement assembly comprises:
    the roller device and a second roller device being spaced apart from the roller device in the aircraft lateral direction, the second roller device comprises:
        a pair of shafts spaced apart from each other, each shaft of the pair of shafts coupled to the fuselage; and
        a pair of rollers rotatably coupled to the pair of shafts, the wing being positioned between the pair of rollers.

5. The aircraft of claim 3, further comprising:
an engine assembly comprising one or more engines, the engine assembly rotatably coupled to the fuselage, the engine assembly configured to rotate between an engine vertical flight position and an engine horizontal flight position.

6. The aircraft of claim 5, further comprising:
a sensor configured to detect when the engaging members are positioned over the pair of openings in the wing; and
a controller communicatively coupled to the sensor, wherein:
the displacement assembly further comprises a first motor operatively coupled to the engaging members and communicatively coupled to the controller, the first motor configured to move the engaging members into the pair of openings formed in the wing, and
the controller is configured to actuate the first motor when the controller receives a signal from the sensor indicative of the engaging members being positioned over the pair of openings in the wing.

7. The aircraft of claim 6, wherein the engine assembly further comprises a second motor operatively coupled to engines and communicatively coupled to the controller, the second motor configured to rotate the engines relative to the fuselage to rotate the engine assembly between the engine vertical flight position and the engine horizontal flight position.

8. The aircraft of claim 1, wherein:
the wing is a front wing and the displacement assembly is a front displacement assembly;
the aircraft further comprises:
a rear wing; and
a rear displacement assembly configured to translate the rear wing relative to the fuselage in the aircraft lateral direction, each of the front displacement assembly and the rear displacement assembly comprises:
a roller device comprising:
a pair of shafts spaced apart from each other, each shaft of the pair of shafts coupled to the fuselage; and
a pair of rollers rotatably coupled to the pair of shafts, the respective wing being positioned between the pair of rollers.

9. A method of operating an aircraft, the method comprising the steps of:
activating one or more engines of an engine assembly of the aircraft to generate thrust in a vertical direction, the aircraft comprising:
a fuselage having a front end and an opposite rear end extending in an aircraft longitudinal direction;
a wing coupled to the fuselage, the wing extending in an aircraft lateral direction perpendicular to the aircraft longitudinal direction; and
a displacement assembly configured to translate the wing relative to the fuselage and in the aircraft lateral direction; and
moving the wing along the displacement assembly in the aircraft lateral direction between a flight position and a stowed position,
wherein in the flight position, the displacement assembly is positioned at a central portion between opposite end portions of the wing such that the displacement assembly is positioned a first distance from one of the end portions of the wing,
wherein in the stowed position, the displacement assembly is positioned proximate one of the end portions of the wing such that the displacement assembly is positioned a second distance from the one of the end portions of the wing, the second distance being less than the first distance.

10. The method of claim 9, further comprising:
moving an engaging member from an unlocked position to a locked position, wherein:
the wing comprises a pair of openings formed in the central portion;
a roller device of the displacement assembly comprises the engaging member configured to move between the unlocked position and the locked position to engage one of the pair of openings in the wing; and
in the locked position, the engaging member is positioned within one of the pair of openings to inhibit movement of the wing.

11. The method of claim 10, further comprising:
detecting when the engaging member is aligned with the pair of openings in the wing.

12. The method of claim 10, further comprising:
moving the engaging member from the locked position to the unlocked position, wherein in the unlocked position, the engaging member is spaced apart from the pair of openings.

13. The method of claim 10, further comprising:
moving the engine assembly from an engine vertical flight position to an engine horizontal flight position, wherein:
the engine assembly is rotatably coupled to the fuselage;
in the engine vertical flight position, the engines generate thrust transverse to the aircraft longitudinal direction; and
in the engine horizontal flight position, the engines generate thrust in the aircraft longitudinal direction; and
activating the engines to generate thrust in the aircraft longitudinal direction.

14. The method of claim 13, further comprising:
moving the engine assembly from the engine horizontal flight position to the engine vertical flight position; and
moving the engaging members from the locked position to the unlocked position, wherein in the unlocked position, the engaging member is spaced apart from the pair of openings.

15. The aircraft of claim 1, wherein the displacement assembly is configured to translate the wing relative to the fuselage in the aircraft lateral direction between the flight position and the stowed position while maintaining the constant length of the wing.

16. The aircraft of claim 1, wherein the displacement assembly is configured to translate the entire wing relative to the fuselage in the aircraft lateral direction between the flight position and the stowed position.

17. The aircraft of claim 1, wherein the displacement assembly is configured to translate a center of the wing relative to a centerline of the fuselage in the aircraft lateral direction between the flight position and the stowed position.

18. The method of claim 9, wherein the displacement assembly is configured to translate the wing relative to the fuselage in the aircraft lateral direction between the flight position and the stowed position while maintaining the constant length of the wing.

19. The method of claim 9, wherein the displacement assembly is configured to translate the entire wing relative to the fuselage in the aircraft lateral direction between the flight position and the stowed position.

20. The method of claim 9, wherein the displacement assembly is configured to translate a center of the wing relative to a centerline of the fuselage in the aircraft lateral direction between the flight position and the stowed position.

\* \* \* \* \*